United States Patent [19]

Daiker et al.

[11] 4,385,941
[45] May 31, 1983

[54] METHOD AND APPARATUS FOR PRODUCING A MOLTEN PUDDLE DURING SCARFING

[76] Inventors: Artur L. Daiker, prospekt B.Khmelnitskogo, 27, kv. 14; Anatoly I. Veis, ulitsa Vorovskogo, 9, kv. 77; Anatoly D. Bogatyrev, ulitsa Solnechnaya, 6b, kv. 44; Evgeny Y. Kochengin, ulitsa Chasovaya, 5, kv. 2; Viktor N. Palko, ulitsa Shosse metallurgov, 37a, kv. 53; Nikolai M. Novoselov, ulitsa Degtyareva, 89, kv. 58; Jury V. Volchematiev, ulitsa Zakharenko, 1-b, kv. 101; Gennady Y. Morozov, ulitsa Kommunisticheskaya, 6a, kv. 67, all of Chelyabinsk, U.S.S.R.

[21] Appl. No.: 320,205

[22] Filed: Nov. 12, 1981

[51] Int. Cl.³ .................................................. B23K 7/08
[52] U.S. Cl. ...................................... 148/9.5; 266/74; 266/75
[58] Field of Search .................... 266/74, 75; 148/9 C, 148/9.5

[56] References Cited
U.S. PATENT DOCUMENTS 2,317,936  4/1943  Nicholson et al. ............... 266/75
2,438,344  3/1948  Meincke ............................ 148/9 C
4,042,225  8/1977  Jones et al. ........................ 266/75

Primary Examiner—W. Stallard
Attorney, Agent, or Firm—Steinberg & Raskin

[57] ABSTRACT

A method for producing a molten puddle on the surface of a metal workpiece to be scarfed consists of igniting a mixture of fuel gas and oxygen. The resultant flame is used for heating a steel wire to a temperature of from 900° to 1450° C., whereupon the steel wire is intermittently fed into a stream of scarfing oxygen to produce droplets of molten metal, which are then transferred by a flow of scarfing oxygen on to the work surface. There is provided apparatus for carrying into effect the above method, which comprises a housing having ducts for supplying a fuel gas and oxygen formed on its periphery; an additional duct for supplying a fuel gas being made in the central part of the housing; a duct for feeding steel wire is provided in the housing in coaxial arrangement with the additional fuel gas supply duct; a scarfing oxygen feeding duct formed in the housing is interposed between the oxygen supply duct and the additional fuel gas supply duct. The duct for feeding a scarfing oxygen is made in the form of a tapered annular slot arranged to permit the stream of scarfing oxygen to be directed at one point on the surface of steel wire.

4 Claims, 3 Drawing Figures

METHOD AND APPARATUS FOR PRODUCING A MOLTEN PUDDLE DURING SCARFING

BACKGROUND

The present invention relates to a method and apparatus for producing molten puddles in the course of scarfing.

The rolled metal is known to have all kinds of defects, such as slivers, cracks or hair-line cracks, etc. These flaws lead to a higher rate of metal consumption required for the manufacture of various products and adversely affect their quality.

An ever increasing volume of rolled stock production as well as stringent requirements imposed on the quality of metal call for the necessity to eliminate such defects.

There is known a method and apparatus for producing the molten puddle during scarfing as described in Czechoslovak Pat. No. 117,390.

The apparatus according to the patent referred to above includes a burner with ducts for supplying a fuel gas and oxygen. The burner is equipped with a folding-back device for prompt ignition of metal, made in the form of a bracket whose one end has a non-consumable electrode cammed therein, the other end thereof being articulated to the burner. In carrying out spot scarfing of randomly located defects, the electrode is fed to a spot at which the scarfing reaction is to begin until it comes in contact with the surface of a metal workpiece being scarfed. An electric current is then passed through the electrode to produce an electric arc between the metal and the electrode. Under the effect of the arc the metal is caused to melt at this spot and a molten puddle is formed on the metal surface. Thereafter, the scarfing operation is commenced by feeding a fuel gas and oxygen while the power supply is concurrently cut off and the electrode is removed.

The scarfing reaction on the surface of cold metal and the formation of the molten puddle take place instantaneously within a fraction of a second. However, this method requires additional power sources, as well as auxiliary equipment for feeding electric current to the electrode and the metal workpiece being scarfed.

U.S. Pat. No. 3,966,503 describes a method for making an instantaneous scarfing start, wherein a ferrous metal wire is brought in contact with a preselected spot on the surface of a metal workpiece. Then, an oblique heating flame, produced by a flow of fuel gas and a low intensity flow of oxygen gas, is directed at the metal surface slightly behind said spot located in the scarfing area. Impinging upon the metal surface, the heating flame is deflected upwardly, whereby the end of wire is heated to ignition temperature in an oxygen atmosphere. When the defective spot on the mobile metal workpiece being scarfed comes in contact with the hot end of the metal wire, a high intensity flow of scarfing oxygen is impinged upon said spot on the work surface. The scarfing oxygen flow is directed at an angle to the metal surface behind the defective spot or at the boundary of the scarfed area along its travel. The end of wire is melted, thereby causing a molten puddle to form in the scarfing area. To prevent its melting, the wire is retracted, while a high intensity oxygen jet causes the puddle to grow to its full width very rapidly. Thereafter, the supply of oxygen is discontinued.

The apparatus for carrying out the above method is described in U.S. Pat. No. 3,991,985. It comprises a means for feeding a ferrous metal wire and for contacting a preselected spot on the metal workpiece being scarfed with the end of said wire, a means for retracting the wire after the molten puddle has been formed on said surface, and a means for producing a flame for heating the end of said wire to its oxygen ignition temperature. The means for producing a heating flame includes ducts for feeding a fuel gas and oxygen. Interposed between said ducts is a duct for supplying a scarfing oxygen (a high intensity flow of oxygen). Although the above-described method requires no power sources, it fails to make fully efficient use of the heating flame, which gives up some of its heating power to the scarfed metal. Therefore, it takes as long as 1.5 sec for the scarfing reaction to take place on the metal surface. This being quite a long period especially where selective scarfing of cold metal workpieces is to be carried out. As a result, the productivity and reliability of the scarfing process are impaired.

In addition, the molten metal of wire is utilized inefficiently since the heating output of the melted wire is distributed over an extended area on the work surface. Moreover, because of irregularities on the surface of the metal workpiece, the deflected heating flame is spread uniformly over the height and width of said surface. Furthermore, by heating the end of wire in the heating flame deflected from the surface of the metal workpiece, it becomes impossible to make an instantaneous scarfing start and, consequently, to carry out the scarfing operation within a distance of 100 to 150 mm from the fron edge thereof.

SUMMARY OF THE INVENTION

It is an object of this invention to provide such a method for producing a molten puddle during scarfing that will make it possible to step up the scarfing reaction on the surface of a metal workpiece and will permit the droplets of molten metal of wire with enhanced heating output to be transferred to a preselected spot on said surface.

Another object of this invention is to provide apparatus for carrying into effect a method of producing a molten puddle on the surface of a metal workpiece being scarfed.

In accordance with the above-mentioned objects the present invention provides a method for producing a molten puddle on the surface of a metal workpiece being scarfed, comprising the steps of igniting the fuel gas-oxygen mixture, heating a steel wire with the resultant flame, wherein the steel wire is heated to a temperature of from 900° to 1,450° C., whereupon the hot wire is intermittently fed into a flow of scarfing oxygen with the resultant formation of droplets of molten metal to be transferred by the flow of scarfing oxygen on to the surface of the metal workpiece being scarfed.

As mentioned above, the steel wire is preferably heated to a temperature ranging from 900° to 1,450° C. Heating the wire below 900° C. would substantially increase the wire melting time in the flow of scarfing oxygen which, in turn, will increase the time required for the puddle formation. Heating the wire above 1,450° C. would result in the ignition of wire at an earlier stage before it is melted to form droplets of molten metal.

The temperature in the scarfing area is raised by virtue of the fact that the droplets of the wire molten metal start oxidizing in the course of their delivery to this area. Therefore, intermittent feeding of wire into the flow of scarfing oxygen, accompanied by the formation of molten drops, permits the wire melt to be effectively used for making an instantaneous thermochemical start on the surface of a metal workpiece. This substantially increases the amount of heat introduced per time unit into the scarfing area and, subsequently, permits the process of puddle formation to be stepped up.

By transferring the droplets of the wire molten metal to the scarfing area on the surface of a metal workpiece by the flow of scarfing oxygen, it becomes possible to ensure a high accuracy delivery of these droplets to the scarfing area. In addition, a thermochemical reaction caused by oxidation of the wire melt is permitted to start in the course of transportation of these drops to said area.

The wire is preferably introduced into the flow of scarfing oxygen to a depth equalling 0.5 to 1 time the diameter of this flow. If this value is less than 0.5 time the diameter of the scarfing oxygen flow, the mass of these drops and, consequently, the overall temperature in the scarfing area, as well as the amount of heat released during the thermochemical reaction and put per time unit into the scarfing area are insufficient for the molten puddle to be formed on the surface of a metal workpiece. With the wire feeding depth being more than one diameter of the scarfing oxygen flow, the method for producing a molten puddle turns out to be inefficient.

The steel wire, required for the formation of droplets of molten metal, is preferably fed in the flow of fuel gas, the latter being enveloped by the flow of scarfing oxygen directed at one point on the steel wire.

Such procedure of feeding the wire, fuel gas and scarfing oxygen gas makes it possible to increase the heating output of each droplet of the wire molten metal. This increase is explained by the fact that fuel gas is burnt in the oxygen which is not contaminated with the products of combustion.

Since the gas flame has a maximum temperature in its centre, a maximum amount of heating power is given up to the wire. As a result, the wire is melted at a faster rate, and the heat-producing reaction in the resultant droplet of molten metal is accelerated.

As mentioned before, the delivery of droplets of the wire molten metal to the scarfing area on the surface of a metal workpiece by the flow of scarfing oxygen, directed at one point on the wire surface, permits the exothermic reaction to be stepped up. This, in turn, results in that a greater number of such droplets are fed per unit of the scarfing area, thereby enhancing the heating power transferred by a droplet of molten metal to produce a molten puddle on the surface of a metal workpiece.

The flow of scarfing oxygen is preferably formed by a plurality of jets. This makes it possible to discharge the products of combustion from the burning zone through the interspaces between the jets, thereby bringing down the rate of oxygen contamination with the combustion products and ensuring a high oxygen concentration in the oxygen scarfing flow.

The foregoing objects are also achieved by this invention which provides apparatus for producing a molten puddle on the surface of a metal workpiece being scarfed, including a housing with ducts for feeding steel wire, oxygen, scarfing oxygen and a fuel gas, wherein, the housing has an additional duct for supplying a fuel gas, with the wire feeding duct being arranged inside the latter and coaxially therewith, the duct for feeding scarfing oxygen being made in the form of an annular slot interposed between the additional duct for supplying a fuel gas and the oxygen supply duct so as to permit the flow of scarfing oxygen to be directed at one point on the surface of steel wire, the fuel gas feeding duct extending around the periphery of said housing.

The annular slot for feeding scarfing oxygen is preferable divided over the circumference by partitions provided to separate the flow of scarfing oxygen into a plurality of jets.

With the method of the invention for making instantaneous scarfing starts it takes only 0.05 to 0.08 sec to form a molten puddle. This renders the method and apparatus of the invention applicable to selective scarfing effected at the metal feeding rate of 0.35 m/sec. In addition, it becomes possible to produce the molten puddle and, consequently, to carry out the scarfing operation on the front edge of the metal workpiece under treatment.

BRIEF DESCRIPTION OF THE DRAWINGS

The invention will now be described, by way of example only, with reference to the accompanying drawings, wherein.

DETAILED DESCRIPTION OF THE INVENTION

A method for producing a molten puddle on the surface of a metal workpiece being scarfed can be easily carried into effect by means of appropriate apparatus well known to those skilled in the art.

A mixture of oxygen and a fuel gas, such as natural or coke gas, is fed to the apparatus housing provided with ducts for supplying a fuel gas, oxygen, scarfing oxygen and wire. The fuel gas is fed under a pressure of 0.003 to 0.08 $\mu$Pa, and oxygen is fed under a pressure of 0.12 to 0.16 $\mu$Pa. The mixture of gases is ignited to produce a flame, with a 3 mm dia steel wire being introduced into the latter. The wire is heated to a temperature of 900° to 1,450° C., whereupon it is fed in a stepwise manner at a rate of 0.03 to 0.05 m/sec into a flow of scarfing oxygen fed under a pressure of 0.5 to 0.7 $\mu$Pa. The end of wire is melted in the scarfing oxygen flow to form droplets of molten metal, which are then transferred by the flow of scarfing oxygen onto the surface of a metal workpiece being scarfed. In the course of delivery, the droplets of molten metal are oxidized to produce a thermochemical reaction. At the instant of contact with the work surface, the scarfing reaction is immediately initiated and a molten puddle is formed at a preselected spot on said surface.

As mentioned before, the hot wire is preferably fed into the flow of scarfing oxygen to a depth equalling 0.5 to 1 time the diameter of the scarfing oxygen flow.

The invention will be further illustrated by the following Examples.

EXAMPLE 1

Fed into a housing through respective ducts formed therein were natural gas, oxygen and steel wire 3 mm in dia. Natural gas was fed under a pressure of 0.05 $\mu$Pa and oxygen under a pressure of 0.12 μPa. The resultant mixture was ignited, thereby heating up the wire to a temperature of 1200° C. The hot wire was then fed in a stepwise manner into the flow of scarfing oxygen to a depth equalling 0.5 time the diameter of this flow. The end of wire introduced into the flow was melted to form droplets of molten metal, which were transferred by the scarfing oxygen flow onto the surface of a metal workpiece, thereby causing an immediate scarfing reaction to begin and a molten puddle to form at a preselected spot on said surface. The puddle formation time was 0.9 sec.

EXAMPLE 2

Natural gas, oxygen and steel wire was fed into a housing through respective ducts formed in the housing of a scarfing machine. The resultant fuel mixture was ignited, thereby heating up the wire to a temperature of 900° C. The hot wire was then fed in a stepwise manner into the flow of scarfing oxygen to a depth of one diameter of this flow. The wire end introduced into the flow was melted to form droplets of molten metal, which were transferred onto the surface of a metal workpiece, thereby causing an immediate scarfing reaction to begin and a molten puddle to form at a preselected spot on said surface. The puddle formation time was 0.8 sec.

Figure 1:
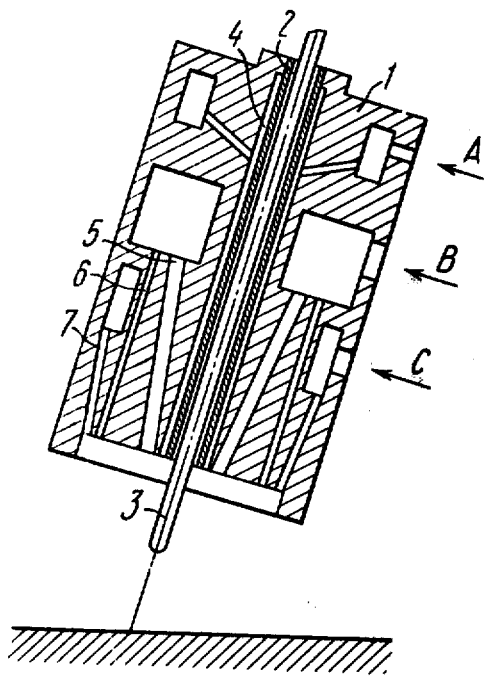
FIG. 1 is a general view, in longitudinal section, of apparatus for carrying into effect the method of the invention for producing a molten puddle on the surface of a metal workpiece.
Figure 2:
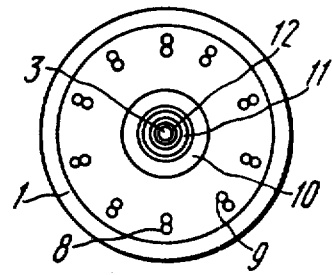
FIG. 2 is a bottom view of apparatus according to the invention.
Figure 3:
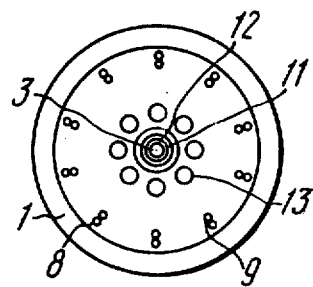
FIG. 3 is a bottom view of apparatus according to the invention.

The method of the invention may be variously otherwise embodied by means of the apparatus shown in FIGS. 1, 2 and 3.

The apparatus, illustrated in FIG. 1, includes a housing 1 having a central duct 2 for feeding a wire 3, an additional duct 4 for feeding a fuel gas, which is arranged coaxially with the wire feeding duct 2, a duct 5 for feeding scarfing oxygen, which is made in the form of a tapered annular slot, a duct 6 for feeding oxygen, and a duct 7 for feeding a fuel gas. The oxygen feeding duct 6 is arranged in parallel relationship with the duct 2 for feeding the wire 3, and the fuel gas supply duct 7 is arranged at an angle to the lower end face of the housing 1.

FIG. 2 is a bottom view of the apparatus shown in FIG. 1. Thus FIG. 2 illustrates mutual arrangement and shapes of outlets 8 and 9 of the respective ducts 7 and 6, shown in FIG. 1, an outlet 10 of the duct 5, shown in FIG. 1, an outlet 11 of the duct 4, shown in FIG. 1, and an outlet 12 of the duct 2, shown in FIG. 1, for feeding the wire 3. The outlets 8 and 9 of the ducts 7 and 6 are ring-shaped and are arranged over concentrical circumferences. The outlet 10 of the duct 5 is made in the form of an annular slot, with the centre of the outlet 12 of the duct 2 being arranged on its axis.

FIG. 3 is a bottom view of the apparatus according to the invention, in which the duct 5 for feeding scarfing oxygen is divided by partitions over its periphery so that openings 13 are formed between these partitions. Shown in FIG. 3 is a mutual arrangement and shapes of the outlets 8 and 9 with respect to the ducts 7 and 6, shown in FIG. 1, the outlets 13 of the duct 5, shown in FIG. 1, the outlet 11 of the additional duct 4, shown in FIG. 1, and the outlet 12 of the wire feeding duct 2, also shown in FIG. 1.

The outlets 8, 9 and 13 of the ducts 7, 6 and 5, shown in FIG. 1, are annular in shape and are arranged over three concentrical circumferences. The outlets 11 and 12 of the ducts 4 and 2 are arranged concentrically. The outlet 12 of the duct 2 is arranged in the centre of the three above-mentioned concentrical outlets 8, 9 and 13.

The method according to the invention is carried into effect by means of the above-described apparatus as follows.

EXAMPLE 3

Coke gas, oxygen and coke gas are fed into the housing 1 respectively in the direction of arrows A,B,C (FIG. 1). Coke gas is fed from the housing 1 through the outlets 11 and 8 (FIG. 2) along the additional duct 4 and the duct 7, and oxygen is fed along the ducts 5 and 6 (FIG. 1) through the outlet 10 and 11 (FIG. 2). Coke gas is fed under a pressure of 0.03 μPa, and oxygen is fed under a pressure of 0.05 μPa. The resultant gas mixture is ignited to produce a heating flame into which a 3 to 4 mm dia steel wire shown at 3 in FIG. 1 is fed along the duct 2 (FIG. 1) through the outlet 12 (FIG. 2). The wire 3 is heated to a temperature of 900° C., whereupon a flow of scarfing oxygen under a pressure of 0.5 μPa is fed along the duct 5 (FIG. 1) through the outlet 10 (FIG. 2). Next, the wire 3 (FIG. 1) is fed in a stepwise manner into the flow of scarfing oxygen at a rate of 0.03 m/sec. The end of the wire 3 is melted in the flow of scarfing oxygen to produce droplets of molten metal, which are then transferred by the flow of scarfing oxygen onto the surface of a metal workpiece, thereby causing an immediate scarfing reaction to begin and a molten puddle to form at a preselected spot on said surface. The puddle formation time is 0.08 sec.

EXAMPLE 4

Natural gas, oxygen and natural gas are respectively fed into the housing 1 in the direction of arrows A,B,C (FIG. 1). Natural gas is fed from the housing 1 along the ducts 4 and 7 (FIG. 1) through the outlets 11 and 8 (FIG. 3), and oxygen is fed along the ducts 5 and 6 (FIG. 1) through the outlets 13 and 8 (FIG. 3). Natural gas is fed under a pressure of 0.08 μPa and oxygen is fed under a pressure of 0.16 μPa. The resultant gas mixture is ignited to produce a heating flame into which a 4 mm wire, shown at 3 in FIG. 1, is fed along the duct 2 (FIG. 1) through the outlet 12. Next, the wire 3 is heated to a temperature of 1,450° C., whereupon a flow of scarfing oxygen is fed under a pressure of 0.7 μPa along the duct 5 (FIG. 1) through the outlets 13 (FIG. 3). Thereafter, the wire 3 is fed in a stepwise manner into the flow of scarfing oxygen at a rate of 0.05 m/sec. The end of the wire 3 is melted in the flow of scarfing oxygen to produce droplets of molten metal, which are transferred by this flow onto the surface of a metal workpiece, thereby causing a thermochemical reaction to begin in the process of delivery of these droplets and a molten puddle to form on contact with the metal surface at a preselected spot thereof.

The combustion products are discharged from the burning zone through the interspaces between the oxygen jets fed along the ducts 5 (FIG. 1) through the outlets 13 (FIG. 3). The puddle formation time was 0.03 sec.

What is claimed is:

1. A method for producing a molten puddle on the surface of a metal workpiece being scarfed, comprising the steps of igniting a fuel gas-oxygen mixture; heating a steel wire with the resultant flame to a temperature of from 900° to 1,450° C.; introducing the thus heated wire in a stepwise manner into a flow of scarfing oxygen in a flow of fuel gas disposed in the scarfing oxygen flow, the latter being directed so as to strike the surface of the metal wire at one point thereof with the resultant formation of droplets of molten metal of said wire; and transferring said droplets of molten metal onto the surface of the metal workpiece being scarfed.

2. A method as claimed in claim 1, wherein the flow of scarfing oxygen is formed by a plurality of jets.

3. Apparatus for producing a molten puddle on the surface of a metal workpiece being scarfed by igniting a fuel gas-oxygen mixture, heating a steel wire with the resultant flame to a temperature of from 900° to 1,450° C., introducing the thus heated wire in a stepwise manner into a flow of scarfing oxygen in a flow of fuel gas disposed in the scarfing oxygen flow, the latter being directed so as to strike the surface of the steel wire at one point thereof with the resultant formation of droplets of molten metal of the wire, and transferring the droplets of molten metal onto the surface of the metal workpiece being scarfed, comprising a housing; ducts for feeding a fuel gas and oxygen, said ducts being formed in said housing around its periphery; an additional duct for feeding a fuel gas, said duct being formed in the central part of said housing; a duct for feeding a steel wire, said duct being formed in said housing and disposed inside said additional duct for feeding fuel gas in a coaxial arrangement therewith; a duct for feeding scarfing oxygen, said duct being formed in said housing and interposed between said oxygen feeding duct and said additional duct for feeding fuel gas; said duct for feeding scarfing oxygen being made in the form of a tapered annular slot arranged so as to permit the stream of scarfing oxygen to strike the surface of steel wire at one point thereof.

4. The apparatus as claimed in claim 3, wherein said tapered annular slot is divided over the circumference by partitions provided to separate the flow of scarfing oxygen into a plurality of jets.

* * * * *